(12) United States Patent
Åkesson

(10) Patent No.: US 11,411,754 B2
(45) Date of Patent: *Aug. 9, 2022

(54) METHODS AND SYSTEMS FOR INTERROGATION REJECTION DURING ONLINE CHARGING SYSTEM OVERLOAD

(71) Applicant: Telefonaktiebolaget LM Ericsson (publ), Stockholm (SE)

(72) Inventor: Gustav Åkesson, Ramdala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 22 days.

This patent is subject to a terminal disclaimer.

(21) Appl. No.: 16/629,853

(22) PCT Filed: Jul. 10, 2017

(86) PCT No.: PCT/SE2017/050771
§ 371 (c)(1),
(2) Date: Jan. 9, 2020

(87) PCT Pub. No.: WO2019/013677
PCT Pub. Date: Jan. 17, 2019

(65) Prior Publication Data
US 2021/0152379 A1     May 20, 2021

(51) Int. Cl.
*H04L 12/14*     (2006.01)
*H04M 15/00*    (2006.01)

(52) U.S. Cl.
CPC ............ *H04L 12/14* (2013.01); *H04M 15/39* (2013.01); *H04M 15/64* (2013.01)

(58) Field of Classification Search
CPC ...... H04M 15/64; H04M 15/67; H04M 15/39; H04M 15/8022; H04M 15/00; H04M 15/8027; H04M 17/00; H04M 15/66; H04M 15/65; H04M 15/8214; H04M 15/854; H04M 15/60; H04M 2215/0168; H04M 15/856; H04M 2215/2026; H04M 2215/204; H04W 15/66; H04W 28/0289; H04W 88/08; H04W 84/042;
(Continued)

(56) References Cited

U.S. PATENT DOCUMENTS 9,479,917 B1 * 10/2016 Gota ................. H04M 15/8228
9,699,038 B2     7/2017 Larsson et al.
(Continued)

FOREIGN PATENT DOCUMENTS

CN       1805442 A     7/2006
CN    102 137 379 A     7/2011
(Continued)

OTHER PUBLICATIONS

International Search Report and Written Opinion dated Apr. 11, 2018 issued in International Application No. PCT/SE2017/050771. (10 pages).

*Primary Examiner* — Nimesh Patel
(74) *Attorney, Agent, or Firm* — Rothwell, Figg, Ernst & Manbeck, P.C.

(57) ABSTRACT

Methods and systems for an online charging service to selectively rejecting Charge Control Requests (CCRs) which it receives and which are associated with charging for the provision of telecommunication services when the online charging system is in an overload state are described.

22 Claims, 12 Drawing Sheets

(58) Field of Classification Search
CPC ... H04W 12/12; H04W 12/126; H04W 12/35; H04W 48/02; H04W 28/04; H04L 12/14; H04L 12/1403; H04L 12/1407; H04L 47/822; H04L 63/1408; H04L 47/125; H04L 47/22; H04L 47/20
See application file for complete search history.

(56) References Cited

U.S. PATENT DOCUMENTS

| | | | | |
|---|---|---|---|---|
| 2006/0114932 | A1* | 6/2006 | Cai | H04M 15/63 370/466 |
| 2011/0003579 | A1* | 1/2011 | Cai | H04W 4/24 455/408 |
| 2012/0023246 | A1* | 1/2012 | Castro Castro | H04W 4/08 709/229 |
| 2012/0072319 | A1* | 3/2012 | Karlsson | H04W 4/24 705/30 |
| 2012/0123914 | A1* | 5/2012 | Sharma | H04M 15/53 705/30 |
| 2012/0149325 | A1* | 6/2012 | Titus | H04M 11/04 455/404.2 |
| 2014/0355428 | A1 | 12/2014 | Smith et al. | |
| 2015/0049605 | A1* | 2/2015 | Mann | H04L 47/12 370/230 |
| 2015/0105045 | A1* | 4/2015 | Rolfe | H04M 15/765 455/406 |
| 2016/0164752 | A1* | 6/2016 | Larsson | H04M 15/785 455/408 |
| 2016/0295025 | A1* | 10/2016 | Huggett | H04M 15/41 |
| 2017/0105241 | A1* | 4/2017 | Nien | H04W 76/19 |
| 2018/0124253 | A1* | 5/2018 | Xu | H04M 15/66 |
| 2018/0309584 | A1* | 10/2018 | Chai | H04L 12/1407 |
| 2018/0359655 | A1* | 12/2018 | Zevallos | H04L 12/14 |
| 2021/0152697 | A1* | 5/2021 | Kesson | H04M 15/8027 |

FOREIGN PATENT DOCUMENTS

| | | |
|---|---|---|
| CN | 102870441 A | 1/2013 |
| CN | 102137379 B | 12/2014 |
| CN | 105493441 A | 4/2016 |
| WO | 2009/108188 A1 | 9/2009 |
| WO | 2016/150508 A1 | 9/2016 |
| WO | 2017/092819 A1 | 6/2017 |

\* cited by examiner

```
<Credit-Control-Request> ::= < Diameter Header: 272, REQ, PXY >
                             < Session-Id >
                             { Origin-Host }
                             { Destination-Realm }
                             { Auth-Application-Id }
                             { Service-Context-Id }
                             { CC-Request-Type }
                             { CC-Request-Number }
                             [ Destination-Host ]
                             [ User-Name ]
                             [ CC-Sub-Session-Id ]
                             [ Acct-Multi-Session-Id ]
                             [ Origin-State-Id ]
                             [ Event-Timestamp ]
                            *[ Subscription-Id ]
                             [ Service-Identifier ]
                             [ Termination-Cause ]
                             [ Requested-Service-Unit ]
                             [ Requested-Action ]
                            *[ Used-Service-Unit ]
                             [ Multiple-Services-Indicator ]
                            *[ Multiple-Services-Credit-Control ]
                            *[ Service-Parameter-Info ]
                             [ CC-Correlation-Id ]
                             [ User-Equipment-Info ]
                            *[ Proxy-Info ]
                            *[ Route-Record ]
                            *[ AVP ]
```

FIG. 4

METHODS AND SYSTEMS FOR INTERROGATION REJECTION DURING ONLINE CHARGING SYSTEM OVERLOAD

CROSS REFERENCE TO RELATED APPLICATION(S)

This application is a 35 U.S.C. § 371 National Stage of International Patent Application No. PCT/SE2017/050771, filed Jul. 10, 2017, designating the United States.

TECHNICAL FIELD

The present invention generally relates to online charging systems and methods and, more particularly, to techniques for dealing with overload situations of such online charging systems.

BACKGROUND

In the 1990s, prepaid services emerged as a new value-added service in the telecommunications industry. Unlike more traditional contract services, prepaid services required the implementation of real-time charging to ensure that prepaid users had sufficient funds in their accounts to pay for the services they were requesting. Initial implementations of real-time charging used an intelligent network approach. This solution worked well for voice services, but fell short as a technique for tracking real-time charging associated with data services. Accordingly, this led to the implementation of specialized service-charging nodes in communication systems.

Generally speaking, online charging is a mechanism that directly interacts, e.g., in real-time, with an account and controls or monitors charges for a service usage. Online charging also typically includes a rating function which can be used as part of the information used to determine the cost of a service usage. Online charging is accessed by service elements in real-time before and during the time that a service is delivered to an end-user. Moreover, online charging can include checking whether credit is available, credit-reservation, and deduction of credit from the end-user's account when service is completed and refunding of reserved credit that is not used.

An example of an online charging system, including service-charging nodes, and its interactions with nodes in a communication system is illustrated in FIG. 1. Therein, service node 100 interacts with the online charging system 102. The service node 100 monitors the usage of assigned charging amounts according to instructions from the online charging system 102. The service node 100 may, for example, be a network element that provides a service to at least one end user, e.g., servers, proxies, a network access server, a SIP proxy, or an application server such as a messaging server, a content server, or a gaming server. As shown in FIG. 1, initially there is executed a step 106 to establish a charging session between the service node 100 and the charging system 102. A session based charging control uses interrogation signals and the online charging system 102 maintains a session state for the session-based charging control. Examples of these interrogations include initial interrogations to initiate a charging process, intermediate interrogations to request a new quota while a service is being rendered, and/or final interrogations to exit the session-based charging control process. During the charging process interrogations are used to report the used quota and request a new one.

After establishment of the charging session in step 106, the service node 100 will execute service delivery in step 108. Then, the service node 100 will forward interrogations to the online charging system 102 so as to report used quota or request new quotas for a service being delivered. On the basis of the interrogations the online charging system 102 will then execute the rating session in the step 110 to determine the charge for the service delivered by the service node 100 according to a rating logic.

The charging session can include, for example, parameters associated with a credit control request (CCR) as specified in the Diameter Credit Control Application specified in RFC 4006, and which is further described below with respect to FIG. 4.

While the above-described example is provided in the context of a single service delivery to a single end-user device, those skilled in the art will appreciate that in an actual implementation the charging system 102 will be handling real-time charging for a much larger number of end-user devices simultaneously. This means that the online charging system 102 will be receiving a large number of interrogation signals and, at some point may become overloaded, i.e., reach a predetermined received signaling load which exceeds a predetermined threshold based on its system capabilities.

When the online charging system becomes overloaded, it cannot immediately process all of the interrogation signals that it receives and, instead, may choose to queue some of the interrogation signals in a buffer for later processing when its system resources permit. The action taken to queue an interrogation signal for later processing by an online charging system is referred to herein as "interrogation rejection", "CCR rejection" or just "rejection". As mentioned above, and as will be described in more detail below, interrogation signals include initial charging session setup interrogation signals, intermediate interrogation signals to indicate usage and/or requesting a new quota and final interrogation signals to close out charging sessions. When faced with an overload situation, conventional online charging systems rather simplistically apply rejection on only the initial charging session setup interrogations signals, i.e., not rejecting on the intermediate or final interrogation signals, since it is guaranteed that this type of interrogation signal has not yet consumed any network resource. Rejecting other requests than the initial interrogation signal has conventionally been considered hazardous since it is highly likely to reject reporting of network usage, consequently causing revenue leakage for the operator.

This conventional approach is problematic at least because the traffic patterns associated with telecommunication systems are changing and the relative amount of initial interrogation signals which can be rejected during overload is going down as a percentage of the total interrogation signal traffic, thereby rendering the conventional approach for handling overload less effective. This paradigm is illustrated in FIGS. 2A and 2B which depict the interrogation request type ratio for voice and data services, respectively, wherein CCR-Initial, CCR-Update and CCR-Terminate refer to the Diameter terminology for the more generally described initial, intermediate and final interrogation signals described above.

In FIG. 2A, it can be seen that for voice services CCR-Initial and CCR-Terminate signals dominate the interrogation signal bandwidth, with CCR-Update signals making up a distant third at only 15% of the total interrogation signal bandwidth. By way of contrast, looking at FIG. 2B, it can be seen that for data services CCR-Update make up the bulk of the interrogation signal bandwidth with CCR-Initial comprising only 19% of the total interrogation signal bandwidth. This discrepancy has several implications for systems which implement an overload handling policy which simplistically only rejects CCR-Initial signals.

Among other issues, this conventional overload handling policy leaves less headroom for gracefully rejecting Diameter interrogations. For voice services based on the exemplary statistics shown in FIG. 2A it can be concluded that 44% of the CCRs can be rejected. In an operator's network which is mainly dominated by voice services, this ratio is rather reasonable and implies that the Diameter charging server can be overloaded by 44% before CCR-U and CCR-T interrogation signals must also be rejected (i.e., when the server is severely overloaded). This means that in voice-intense networks there is plenty of headroom for the online charging system before causing revenue leakage by rejecting interrogation requests carrying usage information. However, today voice traffic seldom dominates operator networks, instead more and more data traffic is the dominant service, making the current technologies for graceful rejections of CCRs more or less obsolete. Today's boom of data services has drastically changed the operator's charging- and signaling characteristics.

Another implicit consequence of using the conventional overload handling policy is that if an operator network has, for example, a 50/50 ratio of voice- and data charging signaling, it is much more likely that voice calls are being rejected than data services. This again is a consequence of the difference in CCR characteristics between the two different types of services. Rejecting more voice than data may or may not be the desired behavior, but from an end-user/subscriber perspective it is likely that a disrupted voice call is more bothersome than a temporary glitch in a data session.

Thus, there is a need to provide methods and systems that overcome the above-described drawbacks associated only rejecting initial interrogation signals when an online charging system is experiencing an overload condition.

SUMMARY

Embodiments allow for an online charging service to selectively reject Charge Control Requests (CCRs) which it receives and which are associated with charging for the provision of telecommunication services when the online charging system is in an overload state.

According to an embodiment, there is a method for rejecting CCR-U (Credit Control Request-Update) interrogation messages associated with charging for telecommunication services by an Online Charging System (OCS) apparatus during a service overload period. The OCS evaluates received CCR-U messages to determine whether each CCR-U message contains any Multiple Services Credit Control (MSCC) information and then rejects CCR-U messages based on properties of the MSCC information.

According to an embodiment, there is an Online Charging System (OCS) for rejecting CCR-U (Credit Control Request-Update) interrogation messages associated with charging for telecommunication services during a service overload period. The system includes at least one processor configured to evaluate received CCR-U messages to determine whether each CCR-U message contains any Multiple Services Credit Control (MSCC) information and to transmit a signal indicating rejection for those CCR-U messages based on properties of the MSCC information.

According to an embodiment, there is a computer-readable storage medium containing a computer-readable code that when read by a computer causes the computer to perform a method for rejecting CCR-U (Credit Control Request-Update) interrogation messages associated with charging for telecommunication services. The method includes evaluating received CCR-U messages to determine whether each CCR-U message contains any Multiple Services Credit Control (MSCC) information and then rejecting CCR-U messages based on properties of the MSCC information.

According to an embodiment, there is an apparatus including a first module configured to evaluate received CCR-U messages to determine whether each CCR-U message contains any Multiple Services Credit Control (MSCC) information and a second module configured to reject CCR-U messages based on properties of the MSCC information.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 depicts the format of a CCR message as specified in RFC 4006;

DETAILED DESCRIPTION

Figure 1:
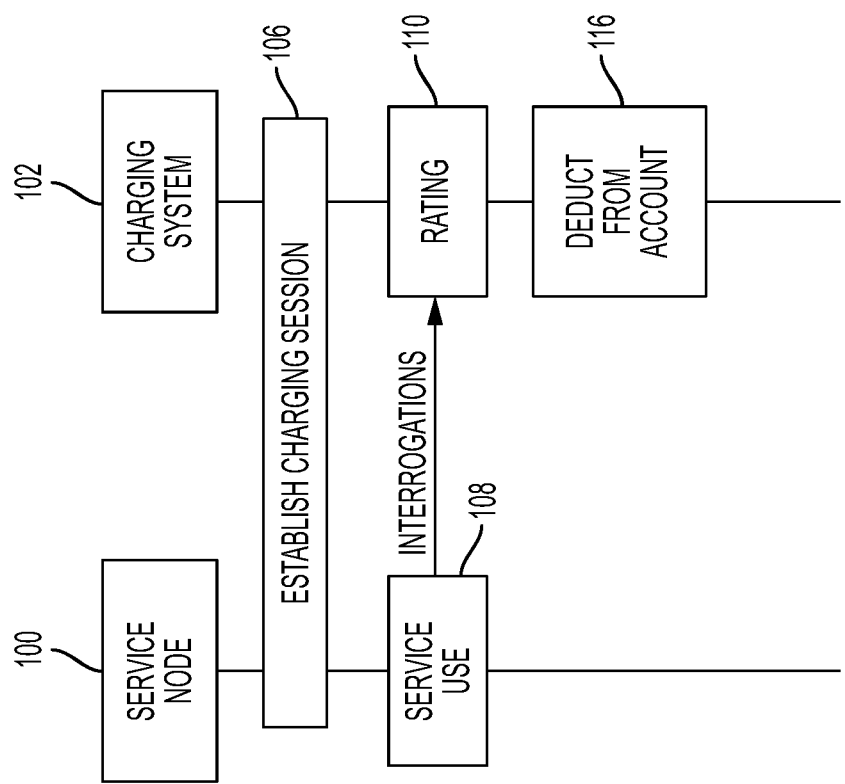
FIG. 1 shows an online charging system, including service-charging nodes, and its interactions with nodes in a communication system.
Figure 2A:
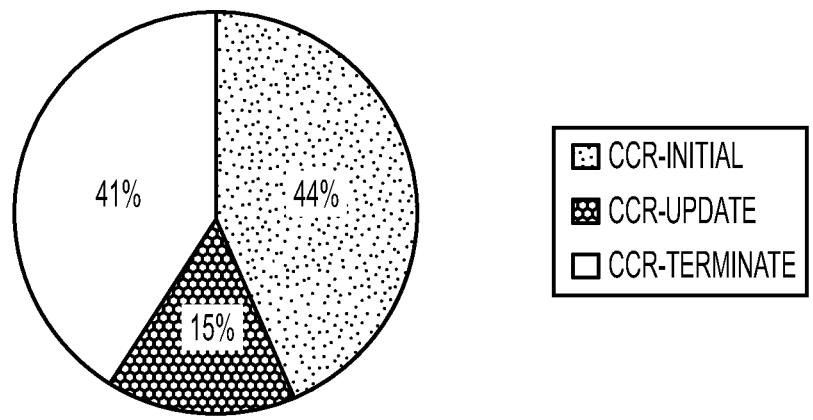
FIG. 2A is a pie chart depicting relative percentages of the different types of Charge Control Request messages for an exemplary voice service.
Figure 2B:
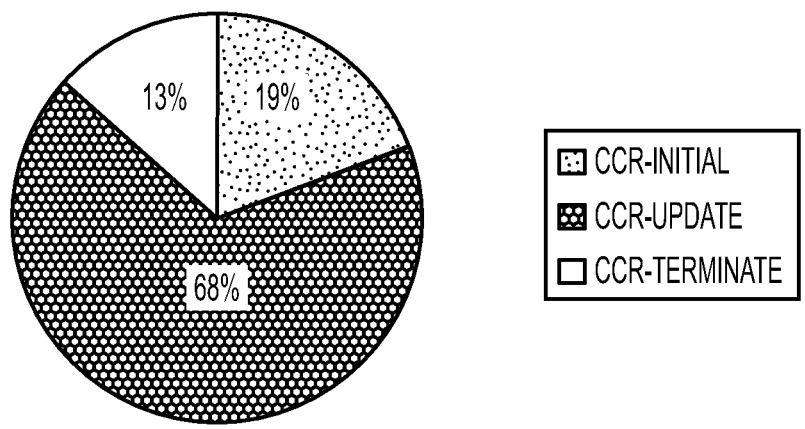
FIG. 2B is a pie chart depicting relative percentages of the different types of Charge Control Request (CCR) messages for an exemplary data service.

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background, the traffic pattern in operator networks has drastically changed the last few years, with data charging signaling becoming the most dominating charging signaling type. It is likely that this trend will accelerate as smartphones and other always-connected devices increase in numbers. This consequently causes the interrogation signaling characteristics from the core network towards the online charging system to change with the proportion of CCR-U signaling constantly increasing. Therefore, embodiments described below provide techniques for online charging systems to gracefully reject CCR-U interrogation signals during times when the online charging system is in overload. This feature will, among other things, make online charging systems operating in accordance with one or more of the below described embodiments more robust and resilient to failure. In addition to describing techniques for rejecting CCR-U interrogation signaling, embodiments also describe prioritization between different resource facing services (such as voice and data), in which either service may get priority over the other. This has the benefit of being able to more aggressively reject, e.g. data instead of voice, or even further fine-grained data-service prioritization such as prioritizing Whatsapp ahead of Netflix.

More specifically, four different techniques for determining when and/or which intermediate interrogation signals, e.g., CCR-U signals, that an online charging system should reject when it is experiencing an overload condition are described below. Briefly, they include (1) rejecting those CCR-U signals which do not contain any Multiple-Services-Credit-Control (MSCC) information elements, (2) rejecting those CCR-U which contain one or more MSCC information element(s), if none of the MSCC information element(s) are reporting usage, (3) rejecting those CCR-U signals which contain one or more MSCC information elements even if they report usage, and/or implement OCS-dictated prioritization between customer facing services, e.g. voice more important than data. These four different techniques can be used together in a particular online charging system, independently of one another in other online charging systems or in any subcombination desired. Each of these techniques will be described in more detail, after a brief description of a Diameter based online charging system (OSC) and Diameter CCR signaling associated with charging scenarios which is provided for context.

One way to implement an OSC with spending-control capability is to employ Diameter base protocol (RFC 3588) as well as the Diameter Credit Control Application (RFC 4006) to perform the interrogation signaling described above with respect to FIG. 1. These embodiments will use Diameter terminology in descriptions, explanations, and examples, but the proposed techniques can be employed in any non-Diameter OCS with similar signaling characteristics. The real-time spending-control property provided by an OCS is typically implemented using charging sessions, in which funds and/or units are reserved upfront on subscriber or account before service is being granted to the end-user. This ensures that the end-user is never able to consume more network resources than allowed, and is always guaranteed to be properly charged for the units that have been used.

This real-time spending-control concept can be applied irrespective of the customer facing service which is being, meaning that the signaling flows described herein are applicable to (but not restricted to) voice, SMS, data, etc. For instance, in a voice call from a calling party (sometimes referred to as the "A-party" in telecom jargon) the typical charging signaling flow would be that an CCR-I signal is initiated towards the OCS when the voice call is being connected to the called party ("B-party"). In that CCR-I interrogation, service units represented as X seconds are being reserved on A-number's account. Actual usage of those reserved units will be reported in a subsequent CCR-U or CCR-T interrogation signal. Whether the subsequent interrogation request is actually a CCR-U or CCR-T signal is dictated by the available funds in conjunction with duration of the call. The fewer funds or the longer the duration of the voice call, the likelier it is for a CCR-U interrogation signal to be initiated prior to the inevitable CCR-T interrogation signal associated with the end of the call.

Figure 3:
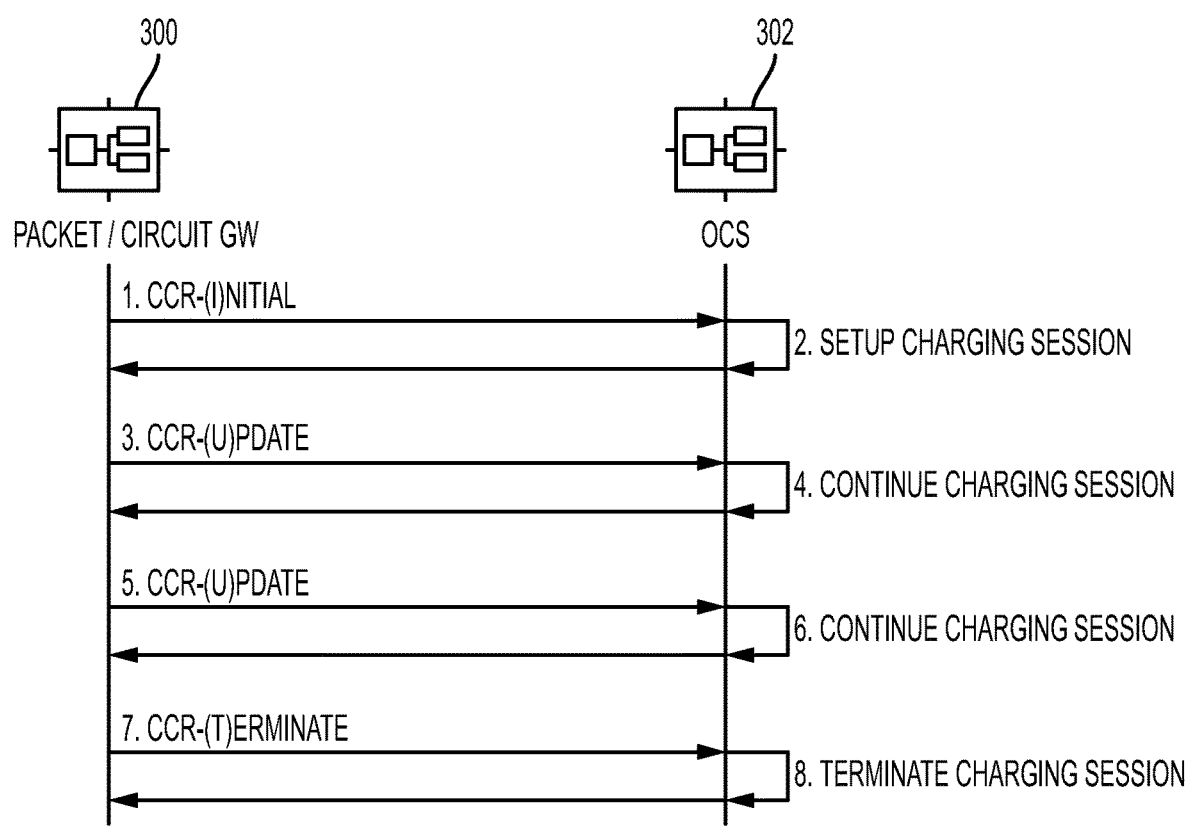
FIG. 3 illustrates exemplary CCR signaling between a gateway node in a telecommunication system and an online charging system (OCS)

FIG. 3 illustrates an exemplary signaling flow associated with a charging session between a network node, e.g., a packet/circuit gateway (GW) 300 in a telecommunication system, and an OCS 302. Note that the number of CCR-U interrogation signals in this example is two, but can theoretically be an infinite number (or none). CCR-I and CCR-T interrogation signals are always present when the CCR session is successfully established. The process and signaling are enumerated in FIG. 3 and described below.

1. Packet/Circuit Gateway 300 sets up the charging authorization session by sending an initial Credit Control Request (CCR-I) signal to Online Charging System (OCS) 302.
2. OCS 302 evaluates the session setup attempt by making sure the subscriber- or account has enough funds for the requested service. Charging validity-time and quota (such as five minutes) is included in the initial Credit Control Answer (CCA-I) sent back to the gateway 300.
3. When either the granted quota is exhausted or the charging validity time expires, the gateway 300 sends an update Credit Control Request (CCR-U) to authorize charging of the used service to the OCS 302.
4. All service usage between the time of CCR-I signal and the time of the CCR-U signal is reported and charged on the subscriber or account by the OCS 302. During the same interrogation, more units are reserved (such as additional five minutes) in order for the user to be allowed to continue using the service.
5. When either the granted quota is exhausted or the charging validity time expires, the gateway 300 sends an update Credit Control Request (CCR-U) to authorize charging of the used service to the OCS 302.
6. All usage between time of previous CCR-U and current CCR-U is reported. During the same interrogation, more units are reserved (such as additional five minutes) in order to be allowed to continue using the service.
7. End-user cancels the service (by e.g. hanging up the voice call) and the gateway sends a terminate Credit Control Request (CCR-T) to OCS.
8. OCS terminates the session and all usage since previous CCR-U is reported. Previously reserved, but unused, units are returned to the subscriber or account.

When implementing online spending-control through Diameter CCR-I/U/T signalling, the requested units (resulting in upfront reservations) and used units (resulting in subsequent charging on the subscriber or account) are reported through Multiple-Services-Credit-Control (MSCC)

Attribute Value Pairs (AVPs) within the actual CCR interrogation. An example of the format of a CCR signal is illustrated as FIG. 4. As stated in RFC 4006, the Credit-Control-Request message (CCR) is indicated by the command-code field being set to 272 and the 'R' bit being set in the Command Flags field and the Auth-Application-Id field is set to the value 4, indicating that this signal is associated with the Diameter credit-control application. For those interested in more details regarding the various information elements associated with CCR signals shown in FIG. 4, the interested reader is directed to the standards document RFC 4006, entitled "Diameter Credit-Control Application", to Hakala et al., August 2005, the contents of which are incorporated here by reference.

The CCR interrogation which encapsulates the MSCC AVP(s) is hereinafter referred to as either "CCR command session" or simply "command session". These MSCC(s) information elements can be referred to as charging service sessions, for example in data charging one MSCC service session can be representing Facebook whereas another MSCC service session can be representing Spotify. Both may belong to the same command session, but can be different MSCC service sessions and thus rated/charged separately. This results in the following predicates regarding the different types of interrogation signals that can be transmitted between the gateway 300 and OSC 302 for charging purposes:

A CCR-I signal may contain MSCC AVP(s) only requesting new units, since the command charging session is currently being established.

A CCR-U signal may contain one or more MSCC AVP(s) requesting new units and/or reporting used units. For example, one CCR-U can contain e.g. three MSCC AVPs during the same interrogation where:

MSCC1 is only requesting new units, i.e. no usage yet on that service session

MSCC2 is only reporting used units, i.e. no continuation for this service; and

MSCC3 is requesting new units and reports usage

A CCR-T signal may only contain MSCC AVP(s) with used units.

Additionally, since the MSCC is an optional AVP in all three CCR operation types (I/U/T) this means that in some cases neither reserved or used units are reported in a particular CCR interrogation signal. This is typically the case when there is no ongoing charging service session (even though the command session is ongoing), e.g. when an end-user is no longer using Facebook, which results in an authorization behavior on the OCS end, such as making sure the subscriber or account still exists.

The implementation of online spending-control through Diameter CCR-I/U/T and MSCCs signaling has robustness implications. During overload of a Diameter server, a portion of the interrogation requests must be rejected by sending some sort of a negative response signal, e.g., a Diameter-Out-Of-Space (result-code 4002) signal, a Diameter-Too-Busy (result-code 3004) signal or a Diameter-Unable-To-Comply (result-code 5012) signal in the Credit Control Answer (CCA) signal in order to indicate to the Diameter charging client that the Diameter server is overloaded and that processing of those rejected interrogation requests will be delayed. Alternatively, when interrogation signals are not rejected the responsive CCA signal can include a Diameter-Success (result code 2001). Rejected interrogation requests can be buffered for later processing when the OCS is less loaded. Based on the foregoing, it will be appreciated that it would not be recommended to reject interrogation requests arbitrarily, since each request type has its own characteristics. Thus the following embodiments provide techniques for selectively rejecting certain interrogation signals.

Figure 5:
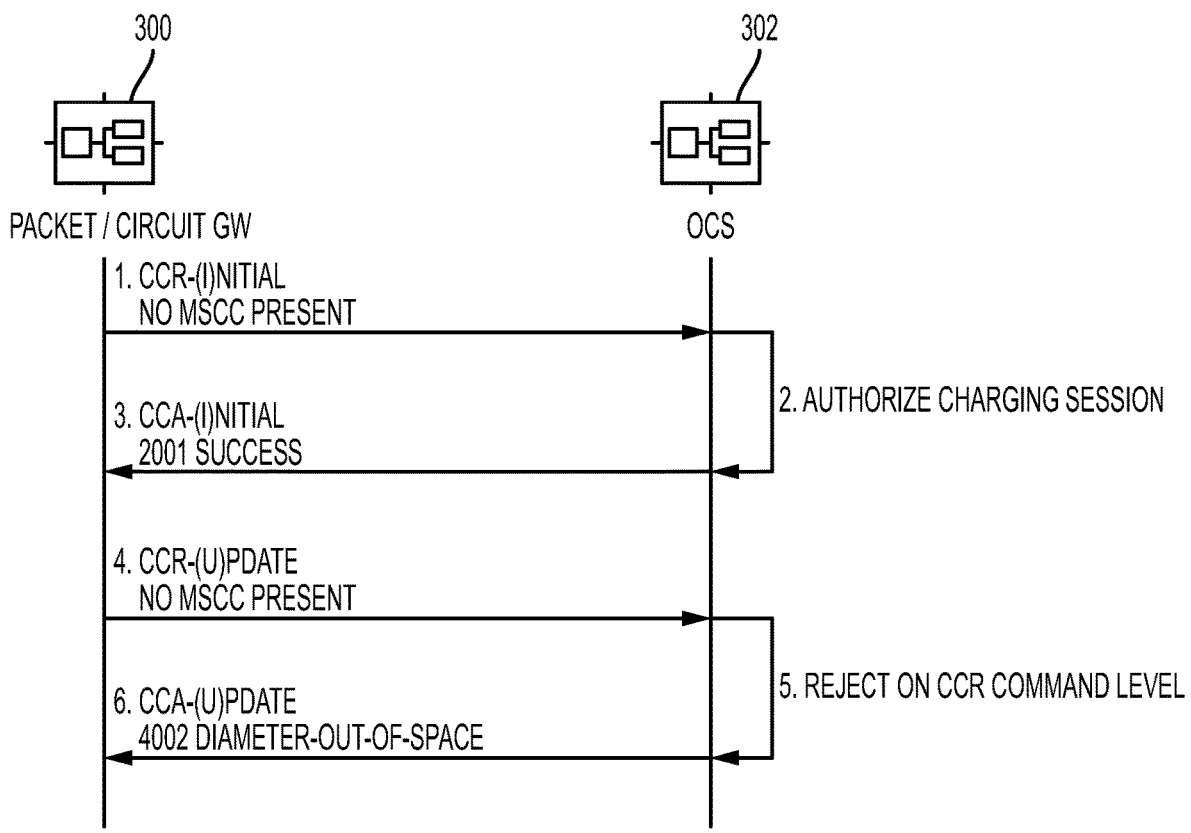
FIG. 5 shows signaling associated with CCR-U rejection according to an embodiment.

According to a first embodiment, an OCS 302 is provided with the capability to reject CCR-U interrogation requests which do not contain any MSCCs. Absence of MSCCs implies there is no ongoing online charging towards the end-user, and is a rather common case for always-connected data charging. This enables rejection on the CCR command level. FIG. 5 illustrates the interrogation signaling flow associated with this first embodiment. Therein each signal is numbered and described below.

1. The Packet/Circuit Gateway 300 sets up the charging authorization session by sending an initial Credit Control Request (CCR-I) to Online Charging System (OCS) 302. This CCR does not contain any MSCC AVPs, causing the session to be setup through authorization only (e.g. authorizing that the subscriber or account exists in OCS).

2. The OCS 302 evaluates the session setup attempt by e.g. making sure the subscriber- or account exists. No rating or reservation is done since no MSCC is present.

3. Success result-code is included in the initial Credit Control Answer (CCA-I) sent back to the core gateway 300 by the OCS 302.

4. After some time, the core gateway 300 sends an update Credit Control Request (CCR-U) to an overloaded OCS 302. No MSCC AVP is present.

5. Since no MSCC AVP is present (i.e. no active charging service session) in the CCR-U and the OCS 302 is overloaded, OCS 302 is capable of gracefully reject the CCR command session without the operator suffering any revenue leakage.

6. Diameter-Out-Of-Space (4002) is returned to the core gateway node 300 on CCR command level (since no MSCC exists).

Figure 6:
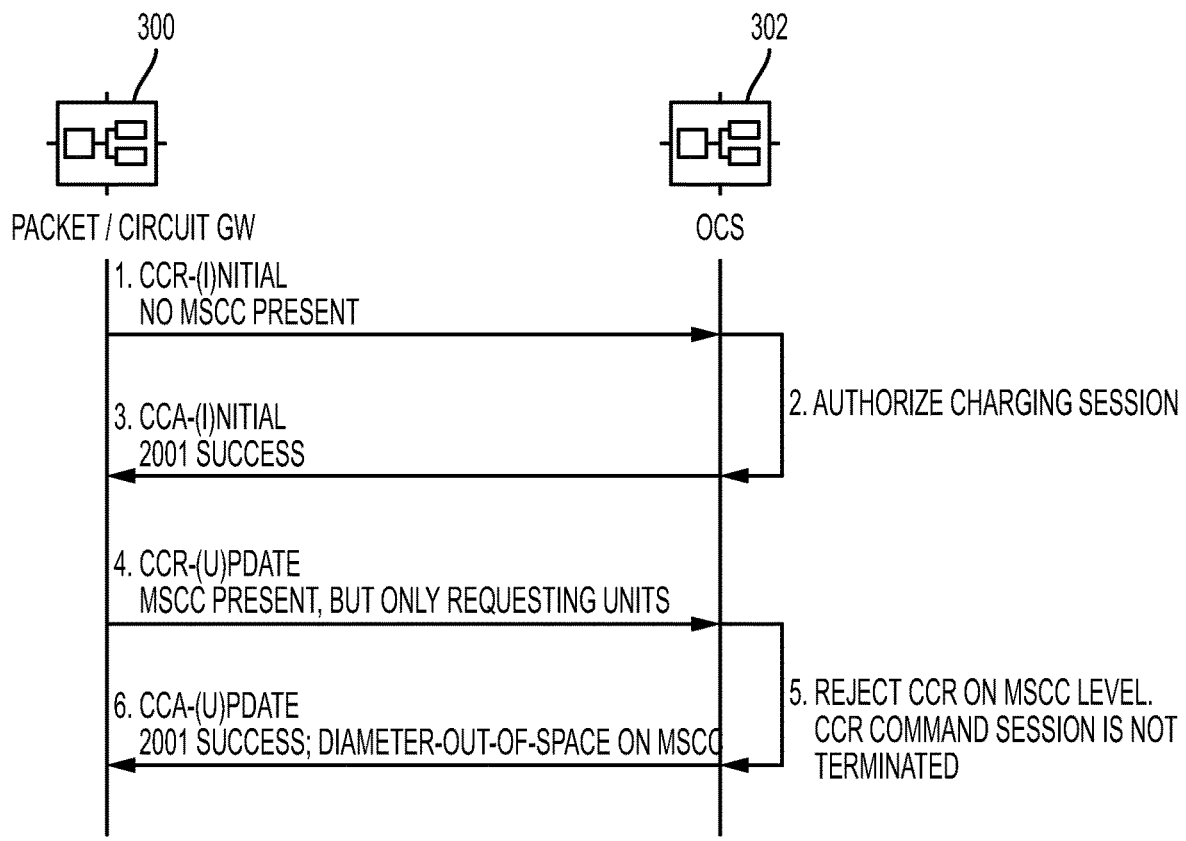
FIG. 6 shows signaling associated with CCR-U rejection according to another embodiment.

According to a second embodiment, an OCS 302 is provided with the capability to reject CCR-U interrogation requests which contain MSCC AVP(s), as long as none of those MSCC AVP(s) are reporting any service usage, i.e. all the MSC AVP(s) in a particular CCR-U interrogation request are only requesting new service units. Since MSCC(s) exist, rejection can only be made on individual MSCC(s), i.e., not at the CCR level. FIG. 6 provides an example of an interrogation flow according to this embodiment again with the numbered signaling being described below.

1. Packet/Circuit Gateway 300 sets up the charging authorization session by sending an initial Credit Control Request (CCR-I) to Online Charging System (OCS) 302. This CCR does not contain any MSCC AVPs.

2. OCS 302 evaluates the session setup attempt by, e.g., making sure the subscriber- or account exists. No rating or reservation is done since no MSCC is present.

3. Success result-code is included in the initial Credit Control Answer (CCA-I) sent back to the core gateway 300 by OCS 302.

4. After some time, the core gateway 300 sends an update Credit Control Request (CCR-U) to an overloaded OCS 302, e.g., an OCS whose interrogation signaling bandwidth has exceeded a predetermined threshold or some other technique by which OCS 302 is determined to be in an overloaded condition. An MSCC AVP is present in this CCR-U signal, but the MSCC AVP is only requesting units, i.e., the end-user is attempting to establish a new charging service session.

5. Since no MSCC is reporting any usage in this particular interrogation request and the OCS 302 is overloaded, OCS 302 is capable of gracefully rejecting the request upfront without operator suffering any revenue leakage.

6. Diameter-Out-Of-Space (4002) is returned to the core gateway node 300 on the MSCC level (and 2001 Success on the CCA command level). It is important to note that the reason for not rejecting the CCR-U on the command level is that there may be other active charging service sessions, which are not part of this particular CCR. Rejecting on command level would then potentially lead to implicit revenue leakage. Alternatively, if the Diameter-Too-Busy (result-code 3004) signal is used to indicate rejection of this interrogation, then the result code would be returned on the command level.

The packet/circuit gateway 300 can take appropriate action when receiving the Diameter-Out-Of-Space signal 4002 on the MSCC-level, by e.g. either blocking the rejected service permanently or, after some time, reattempting the MSCC's service session setup.

Figure 7:
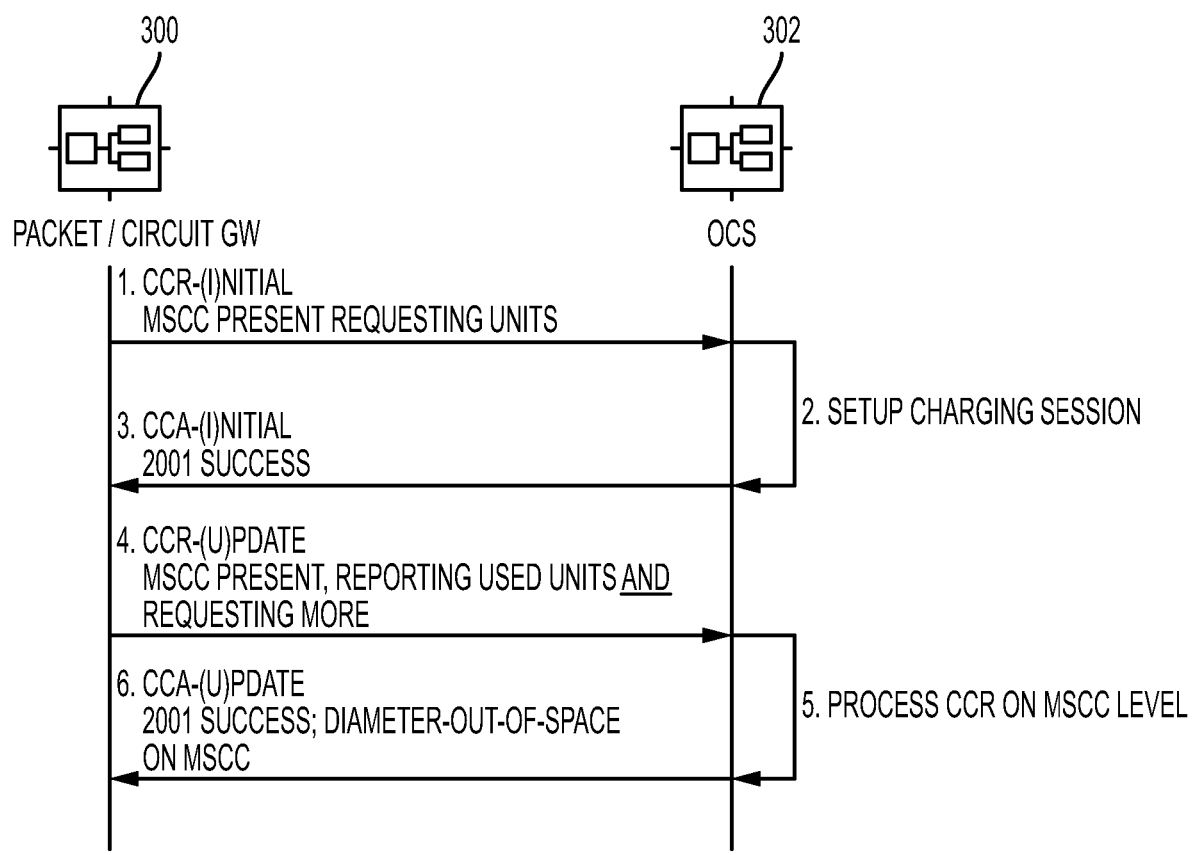
FIG. 7 shows signaling associated with CCR-U rejection according to yet another embodiment.

According to a third embodiment, an OCS 302 is provided with the capability to process-then-reject CCR-U requests which contain MSCC AVP(s) even when those MSCC AVP(s) are reporting service usage. FIG. 7 provides an example of an interrogation signal flow for this embodiment, with the numbered signals being described below.

1. Packet/Circuit Gateway 300 sets up the charging authorization session by sending an initial Credit Control Request (CCR-I) to Online Charging System (OCS) 302. One MSCC is present, which is being used to request service units, i.e. access to a particular service.
2. OCS 302 evaluates the session setup attempt by making sure the subscriber- or account has enough funds for the requested service.
3. A charging validity-time and quota is included in the initial Credit Control Answer (CCA-I) sent back to the gateway 300 by OCS 302.
4. When either the granted quota is exhausted or the charging validity time expires, the gateway 300 sends an update Credit Control Request (CCR-U) interrogation signal to authorize charging of the used service. Used units for the ongoing charging service session (MSCC) is included in the request, as well as an MSCC requesting more units in order to continue using the service.
5. Since the MSCC in the CCR is reporting usage and the OCS 302 is overloaded, OCS 302 must process the CCR and associated MSCC (i.e. charge the subscriber or account for used service). However, due to the fact that OCS 302 is overloaded, the MSCC's request for more units is denied. Only the already used units are reported and processed by OCS 302, but no further units are granted at this time.
6. Even though the CCR and MSCC was processed for the used units, a Diameter-Out-Of-Space (4002) signal is returned to the core gateway node 300 on the MSCC level (and a 2001 Success signal on the command level). This effectively means that the charging service session is gracefully terminated without the operator suffering from any revenue leakage.

According to a fourth embodiment, another advanced selection of interrogation rejections provides the OCS 302 with the capability to prioritize between different customer facing services. This technique is not restricted to any type of CCR, and can be applied regardless of whether the CCR is a CCR-Initial, CCR-Update or CCR-Terminate. When the OCS 302 experiences an overload condition, this embodiment enables an operator to automatically prioritize various charging contexts over others. One example of this behavior would be to give voice services higher priority than data services, meaning that the rejection rate for interrogation signals which are received during overload would be significantly higher for data than voice. This is an appealing feature since disrupted voice calls are likely significantly more disturbing too end users (causing more badwill for the operator) than having a temporary glitch while using a data service would be. This technique can be used in a further fine-grained fashion than simply prioritizing voice relative to data, but can be expanded to a point where different services within a broader category, e.g., data services, can have different priorities during overload. For instance, it might be appealing for operators to let end users utilize Whatsapp with a higher priority than Netflix, i.e., interrogation signals received by an overloaded OCS 302 associated with an end user's usage of Netflix might be rejected more frequently than those associated with an end user's usage of Whatsapp.

Figure 8:
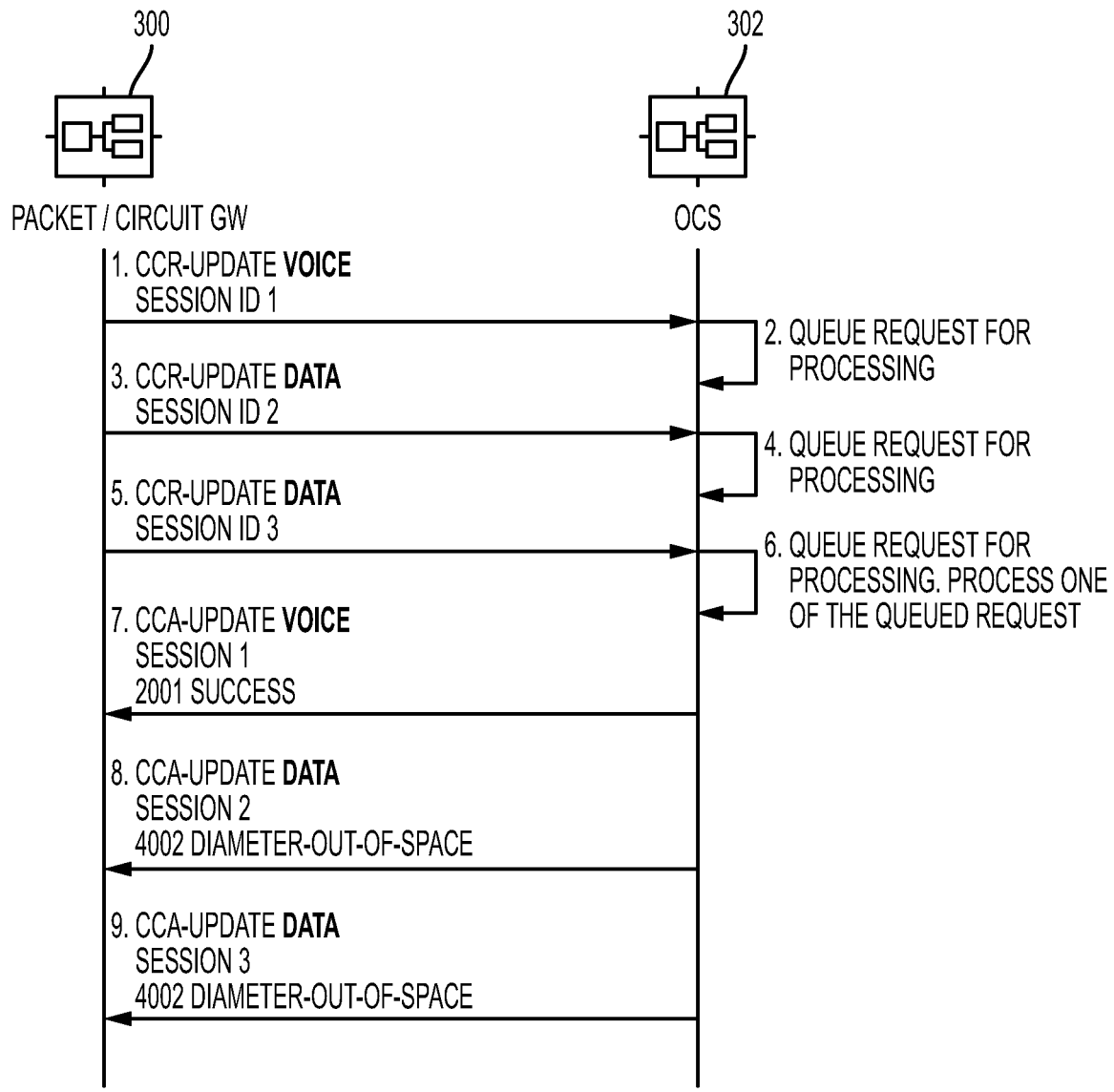
FIG. 8 illustrates signaling associated with CCR rejection based on service type according to an embodiment.

FIG. 8 provides an example of an overloaded OCS 302, which receives three requests that must be processed within a set time limit before reactively rejecting the excess requests which cannot be immediately processed since the OCS 302 is in an overloaded state and which includes logic that prioritizes different services in a predetermined order that is used to determine which interrogation signals to reject. Each of the numbered signals shown in FIG. 8 are described below.

1. Packet/Circuit Gateway 300 authorizes an existing charging session by sending an update Credit Control Request (CCR-U) to Online Charging System (OCS) 302. This session is related to a voice call.
2. An overloaded OCS 302 evaluates the request, but because of system saturation, the request is internally queued for execution.
3. Packet/Circuit Gateway 300 authorizes an existing charging session by sending an update Credit Control Request (CCR-U) to Online Charging System (OCS) 302. This session is related to a first data session.
4. The overloaded OCS 302 evaluates the request, but because of system saturation, the request is internally queued for execution.
5. Packet/Circuit Gateway 300 authorizes an existing charging session by sending an update Credit Control Request (CCR-U) to Online Charging System (OCS) 302. This session is related to a second data session.
6. The overloaded OCS 302 evaluates the request, but because of system saturation, the request is internally queued for execution:
    a. At this point, when the three requests are queued, the OCS 302 has sufficient resources to process one out of the three queued requests.

Because of the customer-facing service prioritization technique, which in this example prioritizes voice over data, the queued interrogation signal associated with the voice session is successfully processed by OCS 302.

7. 2001 Success is returned to the core network for session 1 (i.e., for the voice session)
8. 4002 Diameter-Out-Of-Space is returned to core network for session 2 (i.e., for the first data session). Rejection may either be on MSCC(s) or command session level.
9. 4002 Diameter-Out-Of-Space is returned to core network for session 3 (i.e., for the second data session). Rejection may either be on MSCC(s) or command session level.

In the example shown in FIG. 8, the OCS 302 is only capable of processing one of the three interrogation signal requests, whereas the remaining two must be rejected. Even though the voice session's interrogation signal was received first and thus is the oldest, it is allowed for processing at the expense of the two other data sessions based on the preestablished overload priority. This technique enables a deep-inspection of what customer-facing service the CCR is related to, instead of relying more primitive techniques such as first-in-first-out (i.e. reject oldest request). Note that in the example of FIG. 8, CCR-U interrogation signals are used but, as mentioned previously, this technique is not dependent on whether request types are Initial, Update or Terminate.

The embodiments described herein enable OCSs to be robust and resilient to failure, even during overload and regardless of networks' traffic patterns. This is today particularly important since the characteristics of traffic patterns in telecommunication systems have drastically changed. While described thus far in terms of systems and signaling flows, embodiments can also be expressed as methods, examples of which are provided in the flow diagrams of FIGS. 9 and 10.

Figure 9:
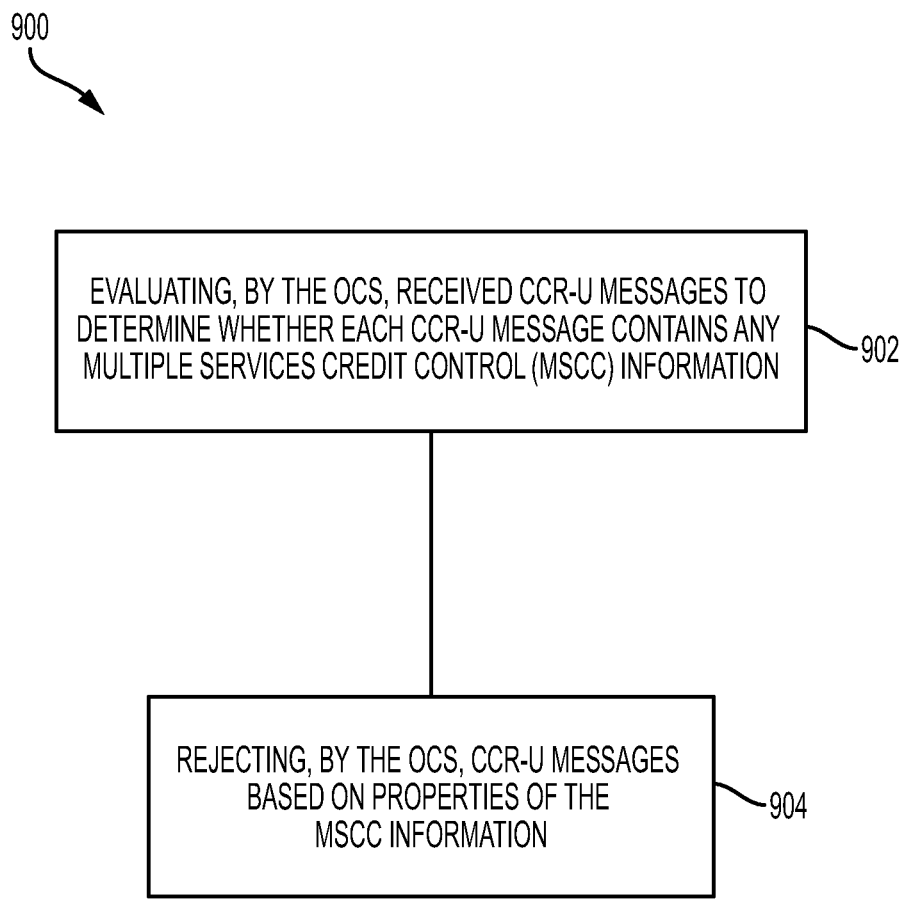
FIG. 9 is a flowchart depicting a method for CCR-U rejection according to an embodiment.

FIG. 9 illustrates a method 900 for rejecting CCR-U (Credit Control Request-Update) interrogation messages associated with charging for telecommunication services by an Online Charging System (OCS) apparatus during a service overload period. At step 902, the OCS evaluates received CCR-U messages to determine whether each CCR-U message contains any Multiple Services Credit Control (MSCC) information. At step 904, the OCS rejects CCR-U messages that do not include MSCC information.

Figure 10:
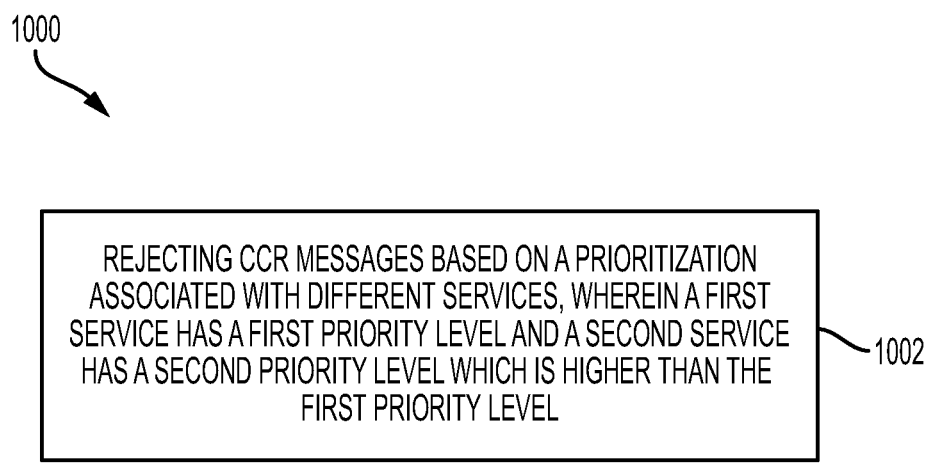
FIG. 10 is a flowchart depicting a method for CCR rejection according to an embodiment.

FIG. 10 illustrates a method 1000 for rejecting CCR (Credit Control Request) messages by an Online Charging System (OCS) apparatus during a service overload period. Therein, at step 1002, the OCS rejects CCR messages based on a prioritization associated with different services, wherein a first service has a first priority level and a second service has a second priority level which is higher than the first priority level.

Figure 11:
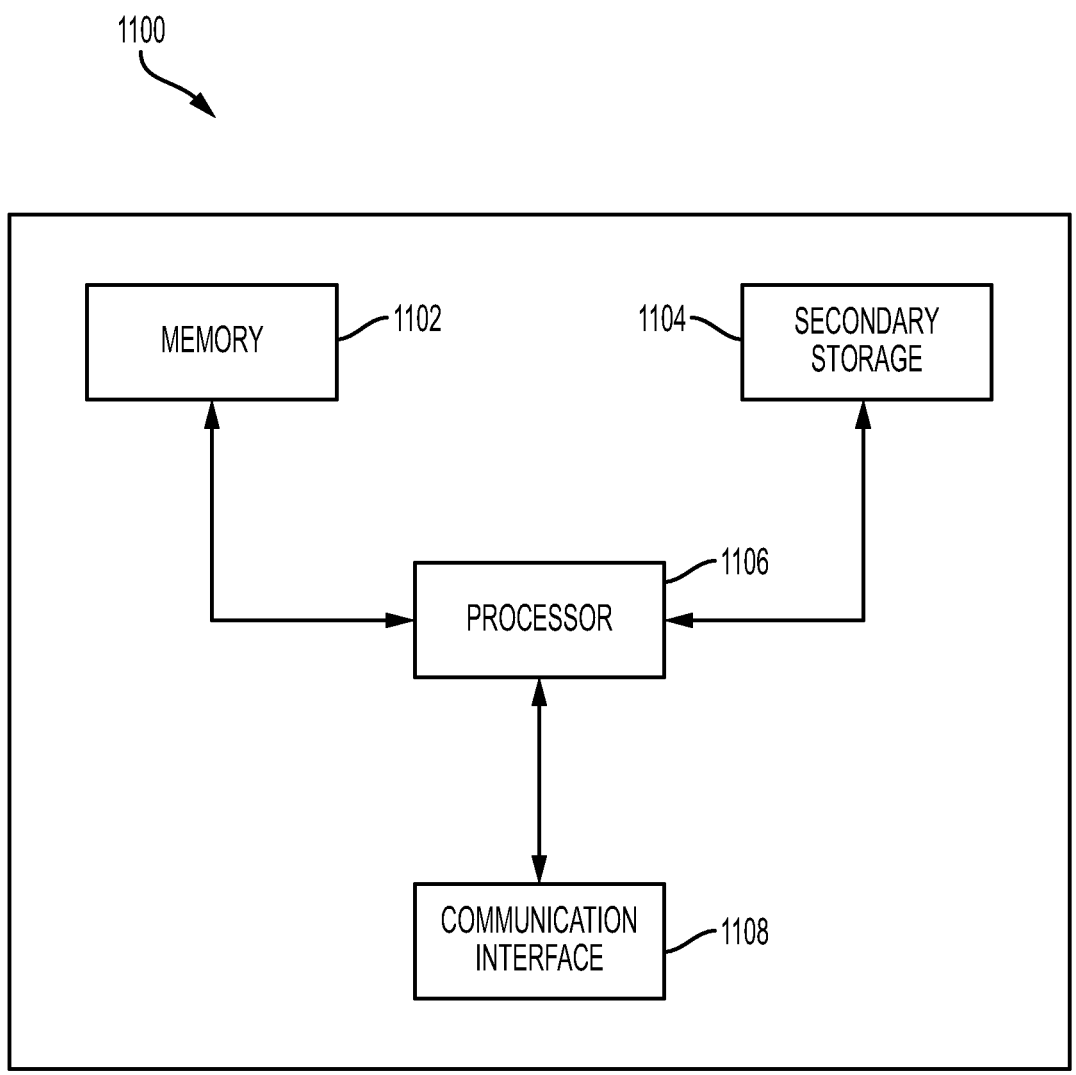
FIG. 11 illustrates a computer processing system which can be used to implement embodiments.

Embodiments described above can be implemented in devices or nodes, e.g., a Diameter server. An example of such a node which can perform the functions described in the various embodiments is shown in FIG. 11. The node 1100 includes at least one processor 1106, a memory 1102, a secondary storage 1104 and an interface 1108. The processor 1106 can execute applications as well as perform the functions of evaluating and rejecting CCR messages as described above. The memory 1102 can include instructions for implementing features described associated with the CCR evaluation and selective rejection. The interface 1108 can be a communications interface used to communicate with operators, networks and the various nodes/functions described herein associated with the various embodiments.

Figure 12:
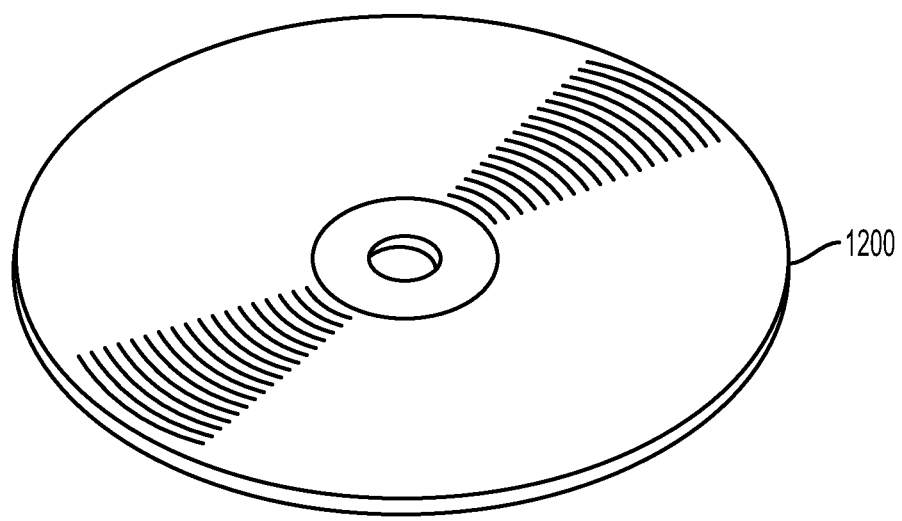
FIG. 12 illustrates a carrier on which a computer program product according to an embodiment resides.

As also will be appreciated by one skilled in the art, the embodiments or portions of the embodiments may take the form of an entirely hardware embodiment or an embodiment combining hardware and software aspects. Further, portions of the embodiments may take the form of a computer program product stored on a computer-readable storage medium having computer-readable instructions embodied in the medium. Any suitable computer-readable medium may be utilized, including hard disks, CD-ROMs (an example of which is illustrated as CD-ROM 1200 in FIG. 12), digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments, in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for processing Credit Control Request-Update (CCR-U) messages, the method being performed by an Online Charging System (OCS) apparatus during a service overload period, the method comprising:
   receiving a CCR-U message;
   determining whether the received CCR-U message contains any Multiple Services Credit Control (MSCC) information; and
   as a result of determining that the CCR-U message contains MSCC information, determining whether or not to issue a rejection in response to the CCR-U message based on the MSCC information contained in the CCR-U message.

2. The method of claim 1, wherein the step of determining whether or not to issue a rejection comprises determining whether the MSCC information does not report any telecommunication service usage.

3. The method claim 1, further comprising:
   processing and acknowledging CCR-U messages that do include MSCC information.

4. The method of claim 1, wherein the step of rejecting further comprises:
   also processing and rejecting CCR-U messages containing MSCCs reporting telecommunication service usage.

5. The method of claim 4, wherein the processing of the CCR-U messages is performed by the OCS for resources used and the rejection of the CCR-U messages is for requested resources.

6. The method of claim 1, wherein the OCS apparatus includes a Diameter server.

7. The method of claim 1, wherein the CCR-U message is initiated by a gateway node.

8. The method of claim 1, wherein the rejection is transmitted by the OCS as one of: a 4002 Diameter-Out-Of-Space message, a 3004 Diameter-Too-Busy message and a 5012 Diameter-Unable-To-Comply message.

9. The method of claim 1, wherein the steps of rejecting CCR-U messages only occur when the OCS apparatus is in a service overload state.

10. The method of claim 1, further comprising:
    prioritizing rejection of CCR messages associated with a first telecommunication service over rejection of CCR messages associated with a second telecommunication service which is different than the first telecommunication service.

11. The method of claim 10, wherein the first telecommunication service is data service and the second telecommunication service is voice service.

12. The method of claim 1, wherein the step of determining whether or not to issue a rejection comprises determining whether the MSCC information contains a request for a new service unit.

13. The method of claim 1, wherein
the MSCC information contained in the CCR-U message comprises one or more MSCC attribute-value-pairs (AVPs), and
the step of determining whether or not to issue the rejection comprises determining whether each MSCCC AVP included in the CCR-U message is requesting a new service unit, and
the method further comprises issuing the rejection as a result of determining that each MSCCC AVP included in the CCR-U message is requesting a new service unit.

14. A method for processing Credit Control Request-Update (CCR-U) messages, the method being performed by an Online Charging System (OCS) apparatus during a service overload period, the method comprising:
receiving a CCR-U message;
determining whether the received CCR-U message contains any Multiple Services Credit Control (MSCC) information; and
(i) rejecting the CCR-U as a result of determining that the CCR-U message does not contain any MSCC information.

15. An Online Charging System (OCS), the OCS comprising:
a receiver for receiving a Credit Control Request-Update (CCR-U) message; and
processing circuitry coupled to the receiver, wherein the OCS is configured to:
determine whether the received CCR-U message contains any Multiple Services Credit Control (MSCC) information;
reject the CCR-U as a result of determining that the CCR-U message does not contain any MSCC information; and
as a result of determining that the CCR-U message contains MSCC information, determine whether or not to issue a rejection in response to the CCR-U message based on the MSCC information contained in the CCR-U message.

16. The system of claim 15, wherein the OCS is configured such that, if the OCS determines that the CCR-U message contains MSCC information, the OCS determines whether or not to issue the rejection by determining whether the MSCC information contains a request for a new service unit.

17. The system of claim 15, wherein the OCS is configured to reject the CCR-U message as a result of determining that the CCR-U message does not include any MSCC information.

18. The system of claim 15, wherein the OCS is further configured to process and acknowledge CCR-U messages that do include MSCC information.

19. The system of claim 15, wherein the OCS is further configured to also process and reject CCR-U messages containing MSCCs reporting telecommunication service usage.

20. The system of claim 19, wherein the OCS is further configured to process CCR-U messages for resources used and the rejection of the CCR-U messages is for requested resources.

21. The system of claim 15, wherein the OCS is part of a Diameter server.

22. The system of claim 15, wherein the CCR-U message is transmitted to the OCS by a gateway node.

* * * * *